US012783840B2

(12) United States Patent
Kamhine et al.

(10) Patent No.: US 12,783,840 B2
(45) Date of Patent: Nov. 3, 2026

(54) GLOBAL AND LOCAL MATRIX CODE DICTIONARIES

(71) Applicant: S.C.R. (ENGINEERS) LIMITED, Netanya (IL)

(72) Inventors: Eliyahou Kamhine, Hod Hasharon (IL); Eran Genzel, Tel-Aviv (IL); Ari Abramson Liani, Binyamina (IL)

(73) Assignee: S.C.R. (ENGINEERS) LIMITED, Netanya (IL)

( * ) Notice: Subject to any disclaimer, the term of this patent is extended or adjusted under 35 U.S.C. 154(b) by 0 days.

(21) Appl. No.: 19/138,124

(22) PCT Filed: Dec. 13, 2023

(86) PCT No.: PCT/IL2023/051267
§ 371 (c)(1),
(2) Date: Jun. 12, 2025

(87) PCT Pub. No.: WO2024/127400
PCT Pub. Date: Jun. 20, 2024

(65) Prior Publication Data

US 2026/0203541 A1 Jul. 16, 2026

(30) Foreign Application Priority Data

Dec. 14, 2022 (IL) .......................................... 299117

(51) Int. Cl.
*G06K 19/06* (2006.01)
*A01K 11/00* (2006.01)
*G06K 7/14* (2006.01)

(52) U.S. Cl.
CPC ...... *G06K 19/06037* (2013.01); *A01K 11/001* (2013.01); *A01K 11/006* (2013.01); *G06K 7/1417* (2013.01); *G06K 7/1439* (2013.01)

(58) Field of Classification Search
CPC ........... G06K 19/06037; G06K 7/1417; G06K 7/1439; A01K 11/001; A01K 11/006
See application file for complete search history.

(56) References Cited

U.S. PATENT DOCUMENTS 8,011,596 B2 * 9/2011 Longacre, Jr. ... G06K 19/06037 235/494
11,653,628 B1 * 5/2023 Herron ................. A01K 11/004 340/573.3

(Continued)

FOREIGN PATENT DOCUMENTS

CN 110826581 A 2/2020
JP 2000137811 A 5/2000

(Continued)

OTHER PUBLICATIONS

Eagan, B. H. et al., Behaviour Real-Time Spatial Tracking Identification (BeRSTID) used for Cat Behaviour Monitoring in an Animal Shelter, Scientific Reports, 12:17585, 1-9, 2022.

(Continued)

*Primary Examiner* — Tuyen K Vo
(74) *Attorney, Agent, or Firm* — Keith O'Doherty

(57) ABSTRACT

The presently disclosed subject matter aims to a system and method for animal identification. The system and method involve the use of global and local dictionaries, such that each local dictionary is associated with a set of matrix code markers derived from a plurality of matrix code markers associated with a global dictionary. The local dictionaries may be associated with respective geographical areas, where their group of matrix code markers can be used to mark a group of animals for identification purposes. In addition, the presently disclosed subject matter aims to an animal tag including a matrix code marker placed thereon. The matrix (Continued)

code marker of the animal tag possesses attributes enabling it to be read at different lighting conditions.

20 Claims, 5 Drawing Sheets

(56) References Cited

U.S. PATENT DOCUMENTS

| | | | | |
|---|---|---|---|---|
| 2005/0199724 | A1* | 9/2005 | Lubow | G06K 19/06046 235/487 |
| 2008/0253608 | A1* | 10/2008 | Long | G06K 7/14 348/222.1 |
| 2012/0199648 | A1* | 8/2012 | Hanson | G01C 21/20 235/375 |
| 2012/0256007 | A1* | 10/2012 | Cok | G06K 19/06056 235/494 |
| 2016/0098581 | A1* | 4/2016 | Martí Ascencio | H04N 1/233 340/5.82 |
| 2016/0275328 | A1* | 9/2016 | Schatt | G06K 19/06056 |
| 2016/0314387 | A1* | 10/2016 | Guenter | G06K 19/06056 |
| 2019/0130236 | A1* | 5/2019 | Campaioli | G06V 10/245 |
| 2021/0264231 | A1* | 8/2021 | Weiss | G06K 19/06056 |

FOREIGN PATENT DOCUMENTS

| | | | |
|---|---|---|---|
| WO | 2008018037 | A2 | 2/2008 |
| WO | 2015091326 | A1 | 6/2015 |

OTHER PUBLICATIONS

Garrido-Jurado, S. et al., Automatic generation and detection of highly reliable fiducial markers under occlusion, Pattern Recognition, 47, 2280-2292, 2014.

Steve Nadis. “Invisible machine-readable labels that identify and trackbrobjects”. Retrieved online on Sep. 3, 2023. URL: bra href= “https://www.wevolver.com/article/invisible-machine-readable-labels-thatidentify-” target=“_blank”https://www.wevolver.com/article/invisible-machine-readable-labels-thatidentify-labrand-track-objects, 5 pages

* cited by examiner

GLOBAL AND LOCAL MATRIX CODE DICTIONARIES

TECHNICAL FIELD

The present invention relates to the field of systems and methods for animal identification, monitoring and/or traceability.

BACKGROUND

Individual animal identification is the basis for maintaining accurate records on members of a herd/flock, enabling producers to keep track of important managerial information (e.g., parentage, birth date, production records, health history, and the like) associated with said members and make individual and/or whole herd/flock management decisions based on it.

Nowadays, a primary tool for individual animal identification is tagging. Tagging is the use of identification means (e.g., tags, and the like) designed to be coupled to at least one body part of a given animal, so as to mark the given animal and enable its identification. Despite the existence of various types of animal tags designed to be coupled to various body parts (e.g., ear/s, neck, leg/s, and the like), operating based on various technologies (e.g., radio frequency identification (RFID), two-dimensional barcode reading, and the like), the identification accuracy and the ability to avoid misidentification remained inconsistent and inadequate. In addition, existing types of animal tags are not always cost efficient for various applications.

Thus, there is a need in the art for a new system and method for animal identification.

GENERAL DESCRIPTION

In accordance with a first aspect of the presently disclosed subject matter, there is provided a system for animal identification comprising a processing circuitry configured to: provide a global dictionary including a plurality of distinct markers, each of which is composed of a plurality of cells forming a matrix code; allocate a group of distinct markers of the plurality of distinct markers to a given local dictionary of multiple local dictionaries, such that each given local dictionary is associated with a subset of markers of the plurality of markers of the global dictionary, and at least two local dictionaries of said multiple local dictionaries include at least one common distinct marker; obtain a reading including: (i) a given marker, and (ii) an identifier associated with a given local dictionary of the multiple local dictionaries; determine whether the given marker is found within the subset of markers associated with the given local dictionary of the multiple local dictionaries; upon the given marker being within the subset of markers associated with the given local dictionary, perform a first action associated with the given local dictionary; upon the given marker not being within the subset of markers associated with the given local dictionary, determine whether the given marker is found within the global dictionary; upon the given marker being within the global dictionary, perform a second action.

In one embodiment of the presently disclosed subject matter and/or embodiments thereof, each subset of markers associated with a local dictionary is composed of randomly selected markers selected from the plurality of markers of the global dictionary.

In one embodiment of the presently disclosed subject matter and/or embodiments thereof, each subset of markers associated with a local dictionary is composed of a plurality of markers in which each pair of markers has a number of differences between its respective matrix codes that is above a predefined threshold.

In one embodiment of the presently disclosed subject matter and/or embodiments thereof, upon the matrix code of the marker, when compared to a given marker of the subset of markers of the given local dictionary, having a number of differences that is below a threshold, the marker is considered to be the given marker.

In one embodiment of the presently disclosed subject matter and/or embodiments thereof, each local dictionary of the local dictionaries is associated with a geographical area.

In one embodiment of the presently disclosed subject matter and/or embodiments thereof, the geographical area is a pen.

In one embodiment of the presently disclosed subject matter and/or embodiments thereof, the markers are ArUco-based markers.

In one embodiment of the presently disclosed subject matter and/or embodiments thereof, the reading of the marker is performed using an active IR camera.

In one embodiment of the presently disclosed subject matter and/or embodiments thereof, the reading of the marker is performed using a visual spectrum camera.

In one embodiment of the presently disclosed subject matter and/or embodiments thereof, the reading of the marker is performed using a camera having visual spectrum and IR imaging obtaining capabilities.

In one embodiment of the presently disclosed subject matter and/or embodiments thereof, (a) the given marker is placed on an animal tag comprising a surface with a hole, such that the given marker covers at least a portion of the surface, (b) at least a portion of the given marker overlaps with the hole of the surface, giving rise to an unreadable matrix barcode portion, and (c) the reading of the given marker does not necessitate the reading of the unreadable matrix barcode portion.

In one embodiment of the presently disclosed subject matter and/or embodiments thereof, the given marker of the animal tag is an ArUco-based marker.

In one embodiment of the presently disclosed subject matter and/or embodiments thereof, the given marker of the animal tag is read using a camera operated in the visual light spectrum.

In one embodiment of the presently disclosed subject matter and/or embodiments thereof, the given marker of the animal tag is read using a camera operated in the IR spectrum.

In one embodiment of the presently disclosed subject matter and/or embodiments thereof, the given marker of the animal tag is square-shaped.

In one embodiment of the presently disclosed subject matter and/or embodiments thereof, the given marker of the animal tag is an 8-cells×8-cells marker.

In one embodiment of the presently disclosed subject matter and/or embodiments thereof, the at least a portion of the given marker of the animal tag is a 2-cells×2-cells portion.

In one embodiment of the presently disclosed subject matter and/or embodiments thereof, the hole of the animal tag is situated at the center of the surface.

In one embodiment of the presently disclosed subject matter and/or embodiments thereof, the animal tag includes a pin protruding from its surface.

In one embodiment of the presently disclosed subject matter and/or embodiments thereof, the pin of the animal tag is a central pin protruding from the center of the tag's surface.

In one embodiment of the presently disclosed subject matter and/or embodiments thereof, the animal tag is attachable to an ear of an animal.

In one embodiment of the presently disclosed subject matter and/or embodiments thereof, the animal is one of: swine, cow, Equidae, sheep, goat.

In accordance with a second aspect of the presently disclosed subject matter, there is provided a method for animal identification comprising: providing a global dictionary including a plurality of markers, each of which is composed of a plurality of cells forming a matrix code; allocating a group of distinct markers of the plurality of markers to a given local dictionary of multiple local dictionaries, such that each given local dictionary is associated with a subset of markers of the plurality of markers of the global dictionary, and at least two local dictionaries of said multiple local dictionaries include at least one common distinct marker; obtaining a reading including: (i) a given marker, and (ii) an identifier associated with a given local dictionary of the multiple local dictionaries; determining whether the given marker is found within the subset of markers associated with the given local dictionary of the multiple local dictionaries; upon the given marker being within the subset of markers associated with the given local dictionary, performing a first action associated with the given local dictionary; upon the given marker not being within the subset of markers associated with the given local dictionary, determining whether the given marker is found within the global dictionary; upon the given marker being within the global dictionary, perform a second action.

In one embodiment of the presently disclosed subject matter and/or embodiments thereof, each subset of markers associated with a local dictionary is composed of randomly selected markers selected from the plurality of markers of the global dictionary.

In one embodiment of the presently disclosed subject matter and/or embodiments thereof, each subset of markers associated with a local dictionary is composed of a plurality of markers in which each pair of markers has a number of differences between its respective matrix codes that is above a predefined threshold.

In one embodiment of the presently disclosed subject matter and/or embodiments thereof, upon the matrix code of the marker, when compared to a given marker of the subset of markers of the given local dictionary, having a number of differences that is below a threshold, the marker is considered to be the given marker.

In one embodiment of the presently disclosed subject matter and/or embodiments thereof, each local dictionary of the local dictionaries is associated with a geographical area.

In one embodiment of the presently disclosed subject matter and/or embodiments thereof, the geographical area is a pen.

In one embodiment of the presently disclosed subject matter and/or embodiments thereof, the markers are ArUco-based markers.

In one embodiment of the presently disclosed subject matter and/or embodiments thereof, the reading of the marker is performed using an active IR camera.

In one embodiment of the presently disclosed subject matter and/or embodiments thereof, the reading of the marker is performed using a visual spectrum camera.

In one embodiment of the presently disclosed subject matter and/or embodiments thereof, the reading of the marker is performed using a camera having visual spectrum and IR imaging obtaining capabilities.

In accordance with a third aspect of the presently disclosed subject matter, there is provided a non-transitory computer readable storage medium having computer readable program code embodied therewith, the computer readable program code, executable by at least one processor to perform a method for animal identification, the method comprising: providing a global dictionary including a plurality of markers, each of which is composed of a plurality of cells forming a matrix code; allocating a group of distinct markers of the plurality of markers to a given local dictionary of multiple local dictionaries, such that each given local dictionary is associated with a subset of markers of the plurality of markers of the global dictionary, and at least two local dictionaries of said multiple local dictionaries include at least one common distinct marker; obtaining a reading including: (i) a given marker, and (ii) an identifier associated with a given local dictionary of the multiple local dictionaries; determining whether the given marker is found within the subset of markers associated with the given local dictionary of the multiple local dictionaries; upon the given marker being within the subset of markers associated with the given local dictionary, performing a first action associated with the given local dictionary; upon the given marker not being within the subset of markers associated with the given local dictionary, determining whether the given marker is found within the global dictionary; upon the given marker being within the global dictionary perform a second action.

In accordance with a fourth aspect of the presently disclosed subject matter, there is provided an animal tag comprising a surface with a hole, and having a matrix barcode marker assembled of a plurality of cells, wherein: (a) the matrix barcode marker covers at least a portion of the surface, (b) at least a portion of the matrix barcode marker overlaps with the hole of the surface, giving rise to an unreadable matrix barcode portion, and (c) the reading of the matrix barcode marker does not necessitate the reading of the unreadable matrix barcode portion.

In one embodiment of the presently disclosed subject matter and/or embodiments thereof, the matrix barcode marker is an ArUco based marker.

In one embodiment of the presently disclosed subject matter and/or embodiments thereof, the matrix barcode marker is read using a camera operated in the visual light spectrum.

In one embodiment of the presently disclosed subject matter and/or embodiments thereof, the matrix barcode marker is read using a camera operated in the IR spectrum.

In one embodiment of the presently disclosed subject matter and/or embodiments thereof, the matrix barcode marker is square-shaped.

In one embodiment of the presently disclosed subject matter and/or embodiments thereof, the matrix barcode marker is an 8-cells×8-cells marker.

In one embodiment of the presently disclosed subject matter and/or embodiments thereof, the at least a portion of the matrix barcode marker is a 2-cells×2-cells portion.

In one embodiment of the presently disclosed subject matter and/or embodiments thereof, the hole is situated at the center of the surface.

In one embodiment of the presently disclosed subject matter and/or embodiments thereof, the tag includes a pin protruding from its surface.

In one embodiment of the presently disclosed subject matter and/or embodiments thereof, the pin is a central pin protruding from the center of the tag's surface.

In one embodiment of the presently disclosed subject matter and/or embodiments thereof, the tag is attachable to an ear of an animal.

In one embodiment of the presently disclosed subject matter and/or embodiments thereof, the animal is one of: swine, cow, Equidae, sheep, goat.

In accordance with a fifth aspect of the presently disclosed subject matter, there is provided an animal tag including a matrix code marker placed thereon, wherein the matrix code marker comprises of (a) a laser-printed layer placed on the animal tag; and (b) an ink-printed layer placed atop the laser printed layer; wherein the laser-printed layer and the ink-printed layer enable reading the matrix code marker at different lighting conditions.

In one embodiment of the presently disclosed subject matter and/or embodiments thereof, the matrix code marker is an ArUco-based code.

In accordance with a sixth aspect of the presently disclosed subject matter, there is provided an animal tag including a matrix code marker placed thereon, wherein the matrix code marker comprises of (i) a matrix code placed on the animal tag, (ii) an IR-transparent color layer covering the matrix code, and (iii) an alphanumeric number printed above the IR-transparent color layer, and wherein the matrix is dedicated to be read by a designated mean, while the alphanumeric number is dedicated to be read by a human eye.

In accordance with a seventh aspect of the presently disclosed subject matter, there is provided an animal tag including a matrix code marker placed thereon, wherein the matrix code marker comprises of an ink-printed layer composed of an ink that is an IR blocking material, enabling reading the matrix code marker at different lighting conditions.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
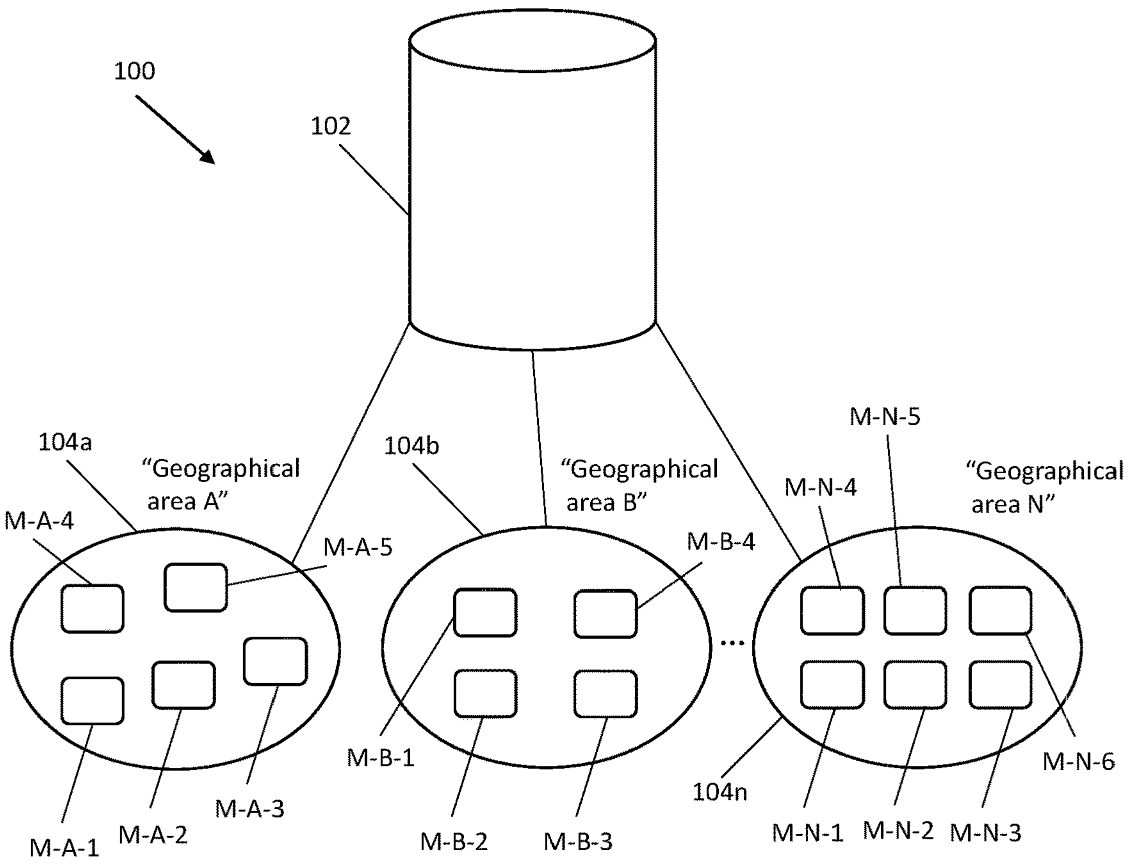
FIG. 1A is a schematic illustration of an environment on which a system for animal identification operates, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "allocating", "determining", "performing" "adding", or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1B:
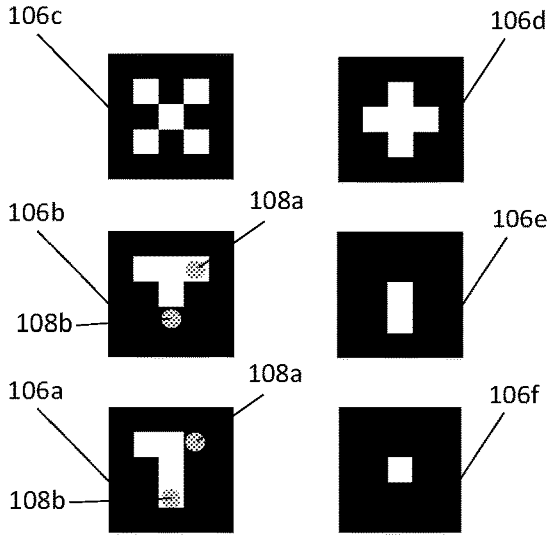
FIG. 1B is a schematic illustration of a plurality of distinct matrix barcode markers, in accordance with the presently disclosed subject matter.
Figure 2:
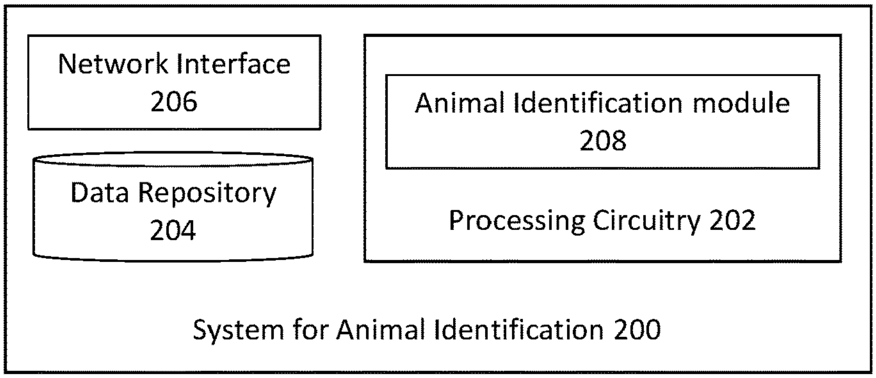
FIG. 2 is a block diagram schematically illustrating one example of a system for animal identification, in accordance with the presently disclosed subject matter.
Figure 3:
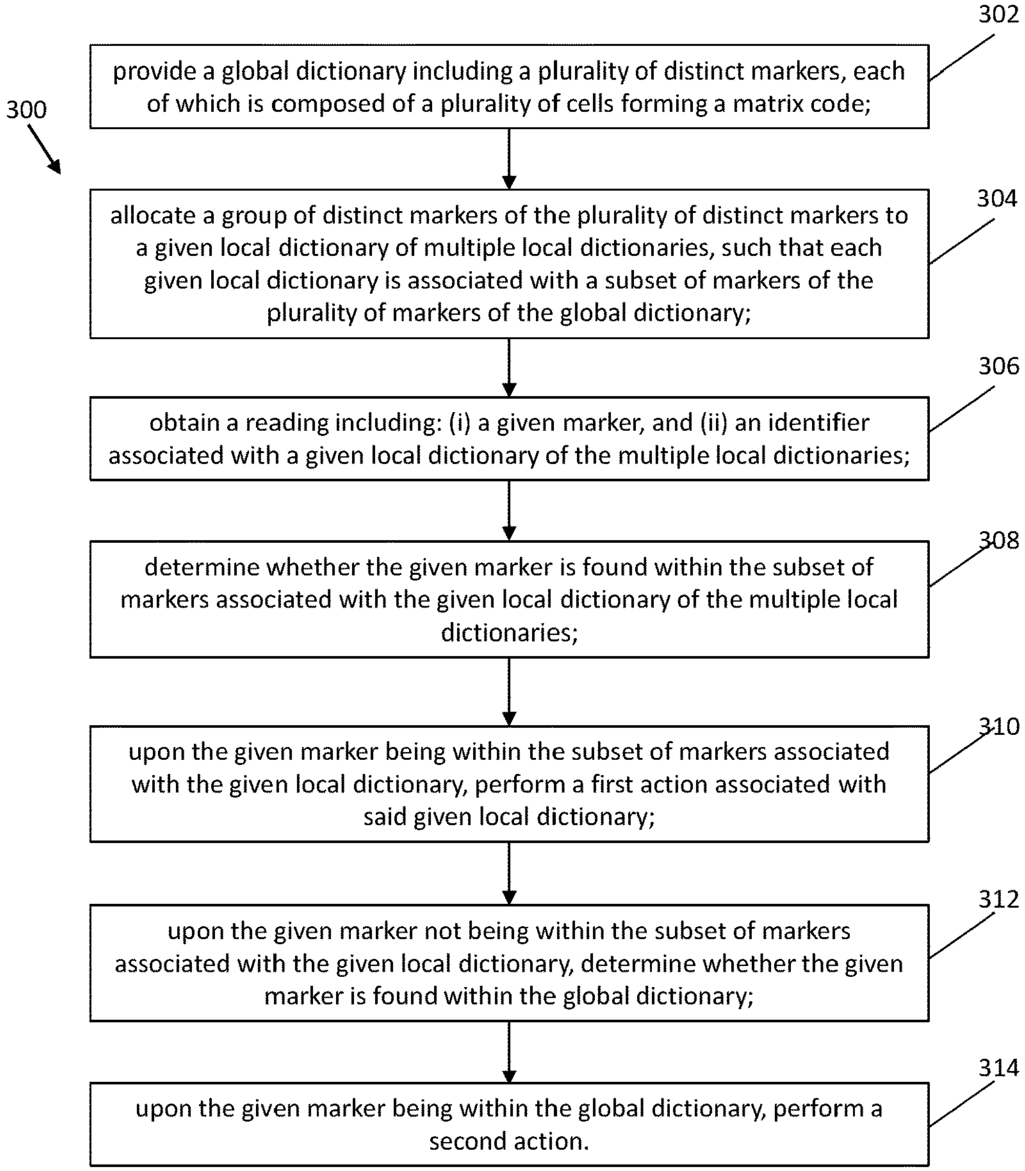
FIG. 3 is a flowchart illustrating an example of a sequence of operations carried out by a system for animal identification, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1A-1B and 2 illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1A, showing a schematic illustration of an environment on which a system for animal identification (also interchangeably referred to herein as "system") operates, in accordance with the presently disclosed subject matter.

As shown in the schematic illustration, environment 100 includes a global dictionary 102 linked to a plurality of local dictionaries, denoted 104*a* to 104*n* (n being an integer number). Each local dictionary of local dictionaries 104*a* to 104*n* may be associated with a respective geographical area, denoted "geographical area A" to "geographical area N" (N being a letter representing any possible number of geographical areas), which may be, for example, a distinct area (i.e., a geographical area not overlapping with any other geographical area).

The global dictionary 102 includes a plurality of distinct matrix barcode markers, each containing a matrix code composed of a plurality of cells (or bits). The matrix code of each given matrix code marker may be, for example, a two-dimensional (2D) code made of black and white cells (for instance, an ArUco code, a QR code, an Aztec Code, an AR Code, a bCode, etc.) arranged in a pattern, e.g., a square pattern (although other patterns, such as rectangular patterns, and the like are also applicable), consisting of a number of rows and columns in correlation with the amount of information stored within it.

The pattern of each given matrix code may contain at least one difference in the layout of its black and white cells compared to the layout of the black and white cells of the matrix codes of other matrix barcode markers of the plurality of matrix barcode markers, so as to differentiate the given matrix barcode marker from all other matrix code markers (also known as hamming distance). For example, as illustrated in FIG. 1B, a plurality of distinct matrix barcode markers, denoted 106*a*-106*f*, are each composed of a plurality of black and white cells forming a square pattern of a matrix code. Each matrix code contains between 1 and 4 differences in the layout of its black and white cells compared to the layout of the black and white cells of the matrix codes of the other matrix barcode markers of markers 106*a*-106*f*. For instance, as shown with respect to matrix code markers 106*a* and 106*b*, the matrix codes of these two markers differ from one another in the position of two white cells (bits), denoted by gray circles 108*a* (representing the position of a first white cell) and 108*b* (representing the position of a second white cell), forming a Hamming distance of 2.

Returning to FIG. 1A, each of the plurality of distinct matrix barcode markers of global dictionary 102 (which may be referred to as a source for available matrix barcode markers) may be allocated to a given local dictionary of the plurality of local dictionaries, denoted 104*a* to 104*n*, such that each given local dictionary may include a respective subset of matrix barcode markers. For example, as illustrated in FIG. 1A, each given local dictionary of local dictionaries 104*a*-104*n* includes a plurality of matrix barcode markers, denoted M-(the letter of the respective local site)—1 to M—(the letter of the respective local site)-n (n being an integer number), which can be used within the geographical area to which the given local dictionary is associated.

The assembly of each subset of matrix barcode markers may be achieved, for example, by one or more of, or a combination of: (i) randomly selecting matrix barcode markers from the plurality of distinct matrix barcode markers of the global dictionary 102, and/or (ii) actively selecting a plurality of matrix barcode markers from global dictionary 102, in which each pair of matrix barcode markers has a Hamming distance between its respective matrix codes that is above a predefined threshold (which, in some cases, can be maximal, thereby ensuring that the markers assigned to each local dictionary are different enough from one another). In cases involving the latter (i.e., (ii)), the Hamming distance may confer error correction capabilities, as will be explained hereinafter.

It is to be noted that other ways of assembling a subset of matrix barcode markers may also be used, mutatis mutandis.

In some cases, the respective subset of matrix barcode markers of each given local dictionary may be composed of matrix barcode markers that are unique to the given local dictionary to which they are allocated, and as such, can be used only within the geographical area to which the given local dictionary is associated. In that configuration, using matrix barcode markers that are unique to the given local dictionary to which they are allocated may be applicable by, for example, monitoring the matrix code markers already in use in one or more of the local dictionaries. For example, the system could track the markers in use by uploading the markers in use to a cloud server that monitors the currently used markers, and/or which local dictionary or geographic area they are used in, etc.).

In other cases, the respective subset of matrix barcode markers of each given local dictionary may be composed of matrix barcode markers also found in other subsets of matrix barcode markers associated with other local dictionaries of local dictionaries 104*a*-104*n*. In that configuration, using matrix barcode markers found in more than one subset of matrix barcode markers may be applicable by using more than one global dictionary. Each global dictionary may be associated with a respective local dictionary of the local dictionaries including the common matrix code markers, and be further associated with a notable visual feature (e.g., color, shape, size, and the like), such that the common markers placed within separate local dictionaries may be easily differentiable. For example, assuming a given matrix code marker is found in two subsets of matrix code markers, the given matrix barcode marker may include a color feature of a certain color combination (e.g., black-on-yellow) as part of a first set of a first global dictionary (e.g., black-on-yellow set) associated with a first given local dictionary, whereas in a second given local dictionary the given matrix barcode marker may include a color feature of another color combination (e.g., black-on-white) as part of a second set of a second global dictionary (e.g., black-on-white set) associated with the second given local dictionary.

Each subset of matrix barcode markers of each given local dictionary associated with a respective geographical area (which may be, for example, a controlled environment such as a barn, a pen, a specific area within a barn or a pen (e.g., a feeding area and/or a drinking area), and the like) may be utilized to mark animals (e.g., livestock animals such as swine, cows, Equidae, sheep, goat, and the like) found within the respective geographical area, so as to differentiate between them. The marking may be executed, for example, by placing each respective matrix barcode marker on a designated tag, e.g., a collar tag, an ear tag, a tail tag, and the like, and coupling the designated tag to a respective body organ of the animal intended for marking.

As a consequence of each of the local dictionaries 104*a*-104*n* being assembled of a subset of matrix code markers allocated from global dictionary 102, each local dictionary may consist of a significantly lesser number of matrix barcode markers compared to the global dictionary 102. As a result, the number of differences in the layout of each pair of matrix barcode markers within each local dictionary (i.e., the Hamming distance) can potentially be considerably greater than that of pairs of matrix barcode markers within the global dictionary 102. This system configuration can enable better detection of a given matrix barcode marker at the local dictionary level, as well as improved error correction processes within each local dictionary of local dictionaries 104*a*-104*n* (which can also occur at the global dictionary level, though to a lesser degree), as explained in further detail hereinafter in relation to FIG. 3.

It should be noted that one of the purposes of the local dictionaries is to address the increased difficulty of error correction in global dictionaries, without sacrificing the necessity of global dictionaries in offering sufficient amount of markers for a large number of animals.

Attention is now drawn to a description of the components of the system for animal identification 200.

FIG. 2 is a block diagram schematically illustrating one example of the system for animal identification 200, in accordance with the presently disclosed subject matter.

In accordance with the presently disclosed subject matter, the system for animal identification 200 (also interchangeably referred to herein as "system 200") can comprise a network interface 206. The network interface 206 (e.g., a network card, a Wi-Fi client, a Li-Fi client, 3G/4G client, or any other component), enables system 200 to communicate over a network with external systems and handles inbound and outbound communications from such systems. For example, system 200 can provide (e.g., receive, generate, or otherwise obtain from any source), through network interface 206, one or more global dictionaries including a plurality of matrix barcode markers.

System 200 can further comprise or be otherwise associated with a data dictionary 204 (e.g., a database, a storage system, a memory including Read Only Memory-ROM, Random Access Memory-RAM, or any other type of memory, etc.) configured to store data. Some examples of data that can be stored in the data dictionary 204 include:

- One or more local dictionaries;
- One or more subsets of matrix barcode markers;
- One or more matrix codes associated with respective one or more matrix barcode markers;
- One or more identifiers associated with respective local dictionaries (will be explained in detail hereinbelow with reference to FIG. 3);
- One or more actions associated with respective local dictionaries and/or global dictionary (will be explained in detail hereinbelow with reference to FIG. 3); etc.

Data repository 204 can be further configured to enable retrieval and/or update and/or deletion of the stored data. It is to be noted that in some cases, data repository 204 can be distributed, while the system 200 has access to the information stored thereon, e.g., via a wired or wireless network to which system 200 is able to connect (utilizing its network interface 206).

System 200 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant system 200 resources and for enabling operations related to system's 200 resources.

The processing circuitry 202 comprises an animal identification module 208, configured to perform an animal identification process, as further detailed herein, inter alia with reference to FIG. 3. It is to be noted that processing circuitry 202 may include additional modules with additional functionality, which may communicate with module 208 through, for example, Application Programming Interfaces (APIs).

Turning to FIG. 3 there is shown a flowchart illustrating one example of operations carried out by the system for animal identification 200, in accordance with the presently disclosed subject matter.

Accordingly, the system for animal identification 200 (also interchangeably referred to hereafter as "system 200") can be configured to perform an animal identification process 300, e.g., using animal identification module 208.

For this purpose, system 200 provides (e.g., receives, generates, or otherwise obtains from any source) a global dictionary including a plurality of distinct markers, each of which is composed of a plurality of cells forming a matrix code (block 302).

By way of a non-limiting example, presented for purposes of better understanding the presently disclosed subject matter and in no way intended to limit the scope of the presently disclosed subject matter, system 200 obtains a global dictionary similar to global dictionary 102 of FIG. 1A, including a plurality of distinct ArUco-based markers (It is to be noted that, in other cases, other types of markers can be used, mutatis mutandis).

System 200 allocates a group of distinct markers of the plurality of distinct markers to a given local dictionary of multiple local dictionaries, such that each given local dictionary is associated with a subset of markers of the plurality of markers of the global dictionary (block 304). The subset of markers of each local dictionary may be composed, for example, of one or more of (or some combination): (i) randomly selected markers selected from the plurality of markers of the global dictionary, (ii) a plurality of markers in which each pair of markers has a number of differences between its respective matrix codes that is above a predefined threshold (which, in some cases, can be, for example, maximal, thereby ensuring that the markers assigned to each local dictionary are different enough from one another).

As indicated hereinbefore in reference to FIG. 1, in addition to associating each given local dictionary with its respective subset of markers of the plurality of markers of the global dictionary, each given local dictionary may be associated with a geographical area (e.g., a controlled environment such as a barn, a pen, a specific area within a barn or a pen (e.g., a feeding station and/or a drinking station), and the like), which may contain animals (e.g., livestock animals such as swine, cows, Equidae, sheep, goat, and the like) each of which is intended to be marked by a respective marker of the subset of markers.

In accordance with our non-limiting example, system 200 allocates three subsets of five ArUco-based markers each, allocated from the plurality of ArUco-based markers of global dictionary 102, to three local dictionaries, denoted "A", "B", and "C". Each of the three local dictionaries (A", "B", and "C") is associated with a respective pig pen, denoted "pen A", "pen B", and "pen C", containing five pigs. Each of the five pigs of each pig pen is marked with a respective ArUco-based marker (using, for example, an ear tag on which the marker is placed) having a number of differences in the layout of its ArUco-based code compared to the layout of the ArUco-based codes of the other four markers above a predefined threshold of four.

Next, system 200 obtains a reading including: (i) a given marker, and (ii) an identifier associated with a given local dictionary of the multiple local dictionaries (block 306). The reading may be obtained, for example, using one of: a camera operated in the visual light spectrum, a camera operated in the IR spectrum, a camera having visual spectrum and IR imaging obtaining capabilities, or any other camera operated in any other spectral field.

In accordance with our non-limiting example, system 200 obtains a reading of a given ArUco-based marker and an identifier associated with local dictionary "A" of the three local dictionaries, "A", "B", and "C".

Following obtaining the marker and the identifier, system 200 determines whether the given marker is found within the subset of markers associated with the given local dictionary of the multiple local dictionaries (block 308).

In accordance with our non-limiting example, system 200 determines whether the given ArUco-based marker is found within the subset of five ArUco-based markers associated with local dictionary "A" (marking the five pigs found within "pen A").

Upon the given marker being within the subset of markers associated with the given local dictionary, system 200 performs a first action associated with said given local dictionary (block 310). The first action may involve, for example, (i) providing a user of system 200 with an indication on whether or not the given marker is within the subset of markers associated with the given local dictionary, (ii) providing a user of system 200 with an indication of the markers closest to the given marker, (iii) providing a user of system 200 with an indication of the animals found within the geographical area associated with the given local dictionary, (iv) providing a user of system 200 with an indication of activities (e.g., treatments, vaccinations, and the like) performed on animals within the geographical area associated with the given local dictionary, (v) providing a user of system 200 with an indication relating to how long a given animal spends at a given area (such as an eating, drinking, or sleeping area), (vi) providing a user of system 200 with an indication relating to how long a given animal is found to be within the vicinity of another animal within the geographical area (for example, for purposes of heat or estrus detection, and the like), etc.

In accordance with our non-limiting example, system 200 determines that the given ArUco-based marker is indeed found within the subset of five ArUco-based markers associated with local dictionary "A", and as a result, an indication that the given ArUco-based marker is found to be within local dictionary "A" is sent to a user of the system.

In some cases, due to the environment in which livestock animals are typically bred (which tends to be muddy, dirty, etc.), the markers used for marking the animals within the given geographical area (for example, by being placed on a designated tag) may be exposed to mud, dirt, abrasion, and the like, which may influence their reading and raise erroneous identification scenarios. To address such scenarios, two error correction processes were developed.

As part of a first error correction process developed, an obtained marker may be considered a given marker when the pattern of the given marker's white cells is the closest to the pattern of the obtained marker's white cells. For example, returning to FIG. 1B, assuming that matrix code marker 106*a* is an obtained marker and that matrix code markers 106*b*-106*f* are markers of a local dictionary, matrix code marker 106*a* would be considered matrix code marker 106*b* since the white cells pattern of matrix code marker 106*b* is the closest to the white cells pattern of matrix code marker 106*a*.

The rationale behind the aforementioned error correction process lies in the fact that the presence of mud or dirt on the given marker's black cells does not affect their reading, as these cells are dark to begin with. Therefore, the presence of mud or dirt on the given marker only affect the reading of its white cells. Next, as part of a second error correction process developed, an obtained marker may be considered a given marker when the differences in the layouts of the black and white cells of the obtained marker and the given marker are below a predefined threshold. The predefined threshold may be, for example, a number of correction bits (i.e., the number of bits that need to be corrected in the obtained marker in order for it to be identical to the given marker), which may be about half of the dictionary's Hamming distance or below. For example, returning to FIG. 1B, assuming that matrix code markers 106*a* and 106*b* are an obtained marker and a given marker, respectively, the two markers would be considered to be the same marker if the matrix codes of these two markers would differ from one another by a number of correction bits that is below half of their Hamming distance.

It is to be noted that the second error correction process may involve similar or different predefined thresholds (e.g., a number of correction bits that is about half of the Hamming distances) for different matrix barcode markers within each local dictionary.

It is to be further noted that the two error correction processes described hereinbefore may be used interchangeably or in combination with one another.

Upon the given marker not being within the subset of markers associated with the given local dictionary, system 200 determines whether the given marker is found within the global dictionary (block 312). Upon the given marker being within the global dictionary system 200 performs a second action (block 314). The second action may involve, for example, (i) providing a user of system 200 with an indication of whether or not the given marker is found within the global dictionary, (ii) adding the given marker to the given local dictionary and providing the user of system 200 with an indication that the given marker was added to the given local dictionary, (iii) providing the user of system 200 with an indication that the given marker was moved from one local dictionary to another local dictionary, (iv) providing the user of system 200 with an indication that the animal that was previously associated with the given marker has deceased, and the like.

In accordance with our non-limiting example, system 200 determines that the given ArUco-based marker is found within the global dictionary, and as such, sends an indication to a user that the given ArUco-based marker was not found within the given local dictionary, as it was moved to another local dictionary.

Figure 4:
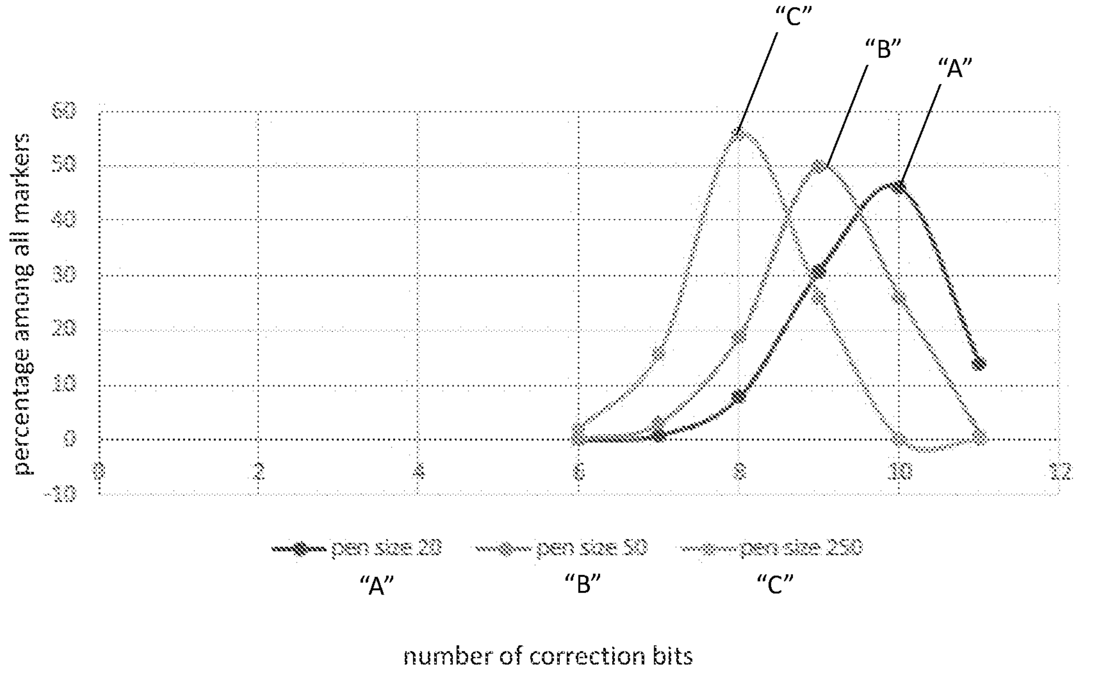
FIG. 4 is a graph representing percentages of matrix barcode markers of a global dictionary and of different sizes of local dictionaries derived from the global dictionary, having different numbers of correction bits, in accordance with the presently disclosed subject matter.

It is to be noted that the first and second error correction processes described hereinbefore with reference to local dictionaries can also be performed at the global dictionary level. With reference to the second error correction process, it is to be further noted that due to the significantly larger number of matrix barcode markers within a global dictionary, the predefined threshold used will generally be lower in the global dictionary compared to local dictionaries. This is due to the significantly higher amount of valid options for each individual marker at the global dictionary level, which can make the error correction process more challenging in global dictionaries compared to local dictionaries. To better emphasize this, attention is drawn to FIG. 4. exhibiting a graph representing a global dictionary of 500 K matrix barcode markers, having a number of correction bits of 6, divided into different sizes of local dictionaries (dictionaries of 20 (denoted “A”), 50 (denoted “B”), and 250 markers (denoted “C”)). As seen in FIG. 4, each size of local dictionary includes different percentages of markers having a number of correction bits ranging between 7 to 11. Since the number of correction bits of different markers within various sizes of local dictionaries is greater than the number of correction bits of the global dictionary (6), there is better detection of markers at the local dictionary level and, as a result, a better error correction process.

The higher the number of corrections bits, the easier it is for the second error correction process described herein to account for reading errors (for example, errors based on dirt, mud, etc.). In one example application, a geographic location such as an animal pen with a low number of animals wearing tags with markers would have greater error correction compared to a larger animal pen with a higher number of animals wearing tags with markers.

Figure 5:
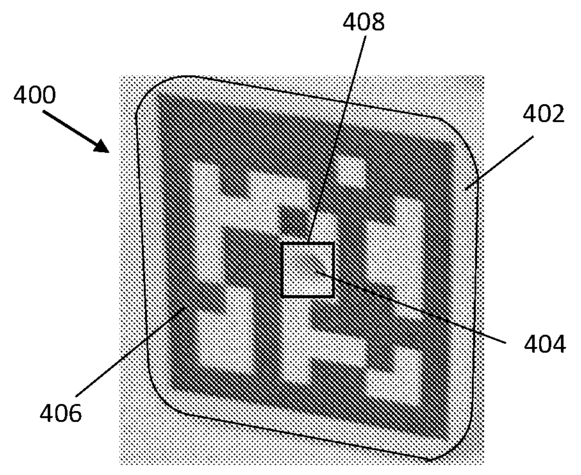
FIG. 5 is a schematic illustration of an exemplary tag containing a matrix barcode marker, in accordance with the presently disclosed subject matter.

Turning to FIG. 5 there is shown an exemplary tag designed to be coupled to a given animal so as to mark it, in accordance with the presently disclosed subject matter.

As shown in FIG. 5, exemplary tag 400 (which may be made of, for example, plastic, aluminum, metal, etc.) includes a surface 402 containing a hole 404, potentially having a practical role, in which it is utilized, for example, for attaching the tag 400 to the given animal, and a matrix barcode marker 406, for example, a matrix barcode marker identical to the matrix barcode markers described hereinbefore in relation to FIGS. 1A and 1B. The matrix barcode marker 406, which may be placed on surface 402 via, for example, glue, printing, laser marking, engraving, and the like, may be designed to cover at least a portion of surface 402 such that at least a portion of the marker overlaps with hole 404, giving rise to an unreadable matrix barcode portion 408 that coincides with the hole 404

In some cases, the matrix barcode marker 406 may be a two-layered matrix barcode marker. The two-layered matrix barcode marker may consist of a laser-printed layer, printed on surface 402, and an ink-jet-printed layer, printed atop the laser-printed layer. Assembly of the matrix barcode marker 406 from the above two layers may enable the reading of the marker at different lighting conditions. For example, the attributes of laser-printed layers may enable optimal reading of such layers during nighttime, or in low light situations (e.g., by using the cameras, or other marker reading systems, operating in the Infra-Red (IR) spectrum). Whereas the attributes of ink-jet-printed layers may enable optimal reading of such layers during daytime or brighter lighting situations. In addition, the ink-jet-printed layers may be configured to be transparent to the IR spectrum, for example by choosing ink that does not absorb in the IR spectrum. In this configuration the use of the IR spectrum to read the laser-printed layer, at any point in time during the day, will not be affected by the presence of the ink-jet-printed layer. By designing the marker as stated above, the tag reading can be optimized both in daytime (or bright lighting environments) as well as nighttime (or low light environments).

Figure 6:
FIG. 6 is a schematic illustration of an exemplary matrix barcode marker imprinted on a tag, in accordance with the presently disclosed subject matter.

In other cases, as illustrated in FIG. 6, the matrix barcode marker 406 may consist of a single layer imprinted onto surface 402, on top of which an additional layer of alphanumeric data is imprinted. The single layer of the matrix barcode marker 406 may be of a material non-readable and/or non-detectable by the human eye (e.g., a IR ink, etc.), whereas the additional layer of alphanumeric data may be of a material readable and/or detectable by the human eye (e.g., a colored ink, etc.). As the non-readable and/or non-detectable material can be read by dedicated means such as cameras (e.g., IR cameras), and the like, while the readable and/or detectable material can be recognized relatively easily by the human eye or a vision mean, the distinction between the various matrix barcode markers becomes a two-level distinction. The two-level distinction includes both manual distinction (using the human eye or similar visible light-based detection) and automatic distinction (using the dedicated IR camera(s)).

It is to be noted that matrix barcode marker 406 may consist of only one of the layers listed above, or of more than the two layers listed above, mutatis mutandis. In one non-limiting example, matrix barcode marker 406 may consist of: (i) a matrix code imprinted onto surface 402 (visible to both IR and the human eye), (ii) an IR-transparent color layer covering said matrix code, and (iii) an alphanumeric number printed in ink above said IR-transparent color layer.

It is to be noted that, in some cases, other types of layers, made of other techniques and/or materials, such as an ink that is an IR blocking material (enabling reading of the matrix barcode marker 406 during daytime and during nighttime), may be used, mutatis mutandis. The use of such techniques and/or materials may be advantageous, given that these techniques and/or materials involve less production, less production cost, shorter production time, etc.

The unreadable matrix barcode portion 408, which may be, for example, a portion of matrix barcode marker 406 not including stored information designed to be read during the reading process of matrix barcode marker 406, may be designed not to affect the reading of matrix barcode marker 406, such that the reading of marker 406 does not necessitate the reading of unreadable matrix barcode portion 408.

In some cases, the portion of surface 402, covered by matrix barcode marker 406, may be a relatively wide area of tag 400 so that the matrix barcode marker 406 may be easily viewed by a sensor (e.g., a camera), designated to read matrix barcode marker 406.

Tag 400 may further include a pin (not shown) protruding from its surface 402. The protruding pin, which may enable the coupling of tag 400 to a given animal, for example, by inserting the pin through the given animal's ear, may protrude from the side of square surface 402 that does not contain the matrix barcode marker 406, so as to avoid interference to the marker's 406 reading. In addition, the protruding pin may be situated at different sections of surface 402, e.g., the center of surface 402, and be located opposite or not to hole 404, such that the protruding pin can be either hollow or non-hollow.

Figure 7A:
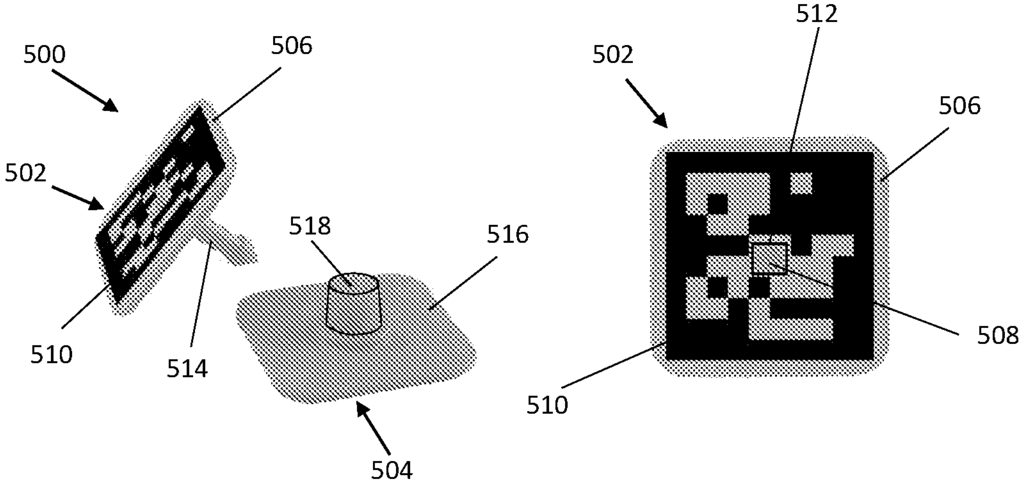
FIGS. 7A-7B are schematic illustrations of exemplary two-piece tags containing a matrix barcode marker, in accordance with the presently disclosed subject matter; and, FIG. 7C is a schematic illustration of an exemplary one-piece tag containing a matrix barcode marker, in accordance with the presently disclosed subject matter.
Figure 7B:
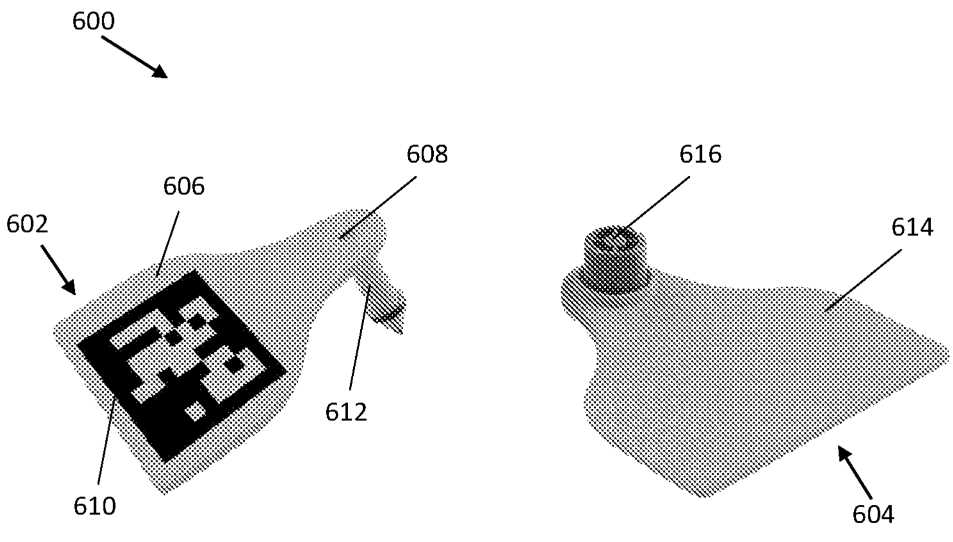
Figure 7C:
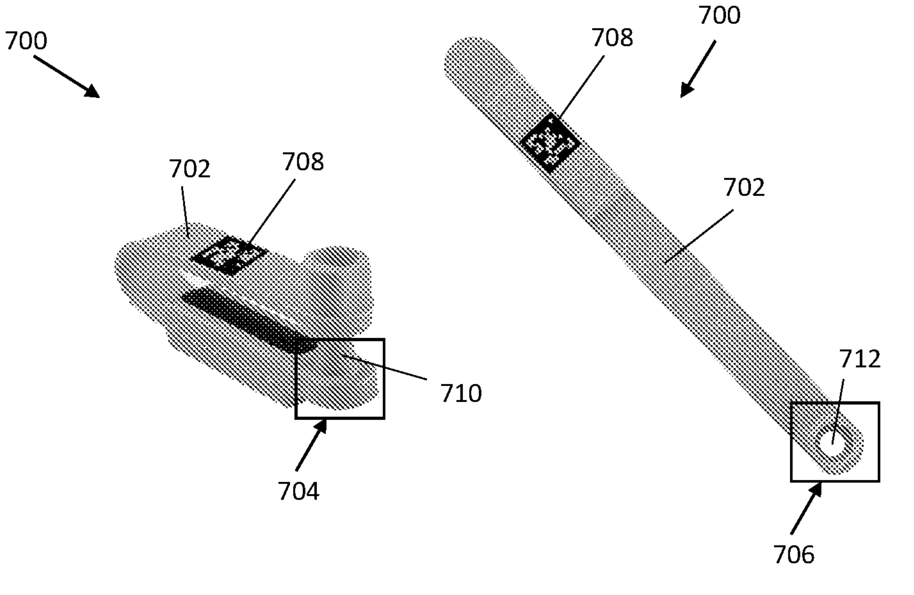

FIGS. 7A-7C are schematic illustrations of non-limiting examples of tag 400 presented merely for purposes of better understanding the disclosed subject matter and not in any way intended to limit its scope.

As illustrated in FIG. 7A, tag 400 may be a two-piece tag, denoted 500. Two-piece tag 500 consists of a male member 502 and a female member 504.

The male member 502 includes a square surface 506 containing on one of its sides (i) a hole 508 positioned at the center of said side, and (ii) an 8-cells×8-cells ArUco-based marker 510 having a 2-cells×2-cells portion of an unreadable matrix barcode portion 512, which overlaps with hole 508. In addition, the male member 502 includes a central pin 514 protruding from the opposite side of square surface 506, which does not contain the 8-cells×8-cells ArUco-based marker, such that the protruding pin is situated opposite hole 508.

The female member 504 includes a square surface 516, which coincides with square surface 506 of male member 502, and a hollow protrusion 518 configured to accommodate central pin 514, as the male member 502 and the female member 504 are coupled together.

In operation, the central pin 514 of male member 502 is passed therethrough a body part of an animal (e.g., an animal's ear), from one side of the body part to the other, so that on the other side, the central pin 514 is inserted into the hollow protrusion 518 of female member 504, where it is held. By the end of this operation, the male member 502 and the female member 504 are found on opposite sides of the animal's body part and the two-piece tag 500 is coupled to the animal's body part.

Turning to FIG. 7B there is shown another example of a two-piece tag, in accordance with the presently disclosed subject matter.

As shown in FIG. 7B, a two-piece tag, denoted 600, consists of a male member 602 and a female member 604.

The male member 602 includes a surface 606 containing (i) a hole 608 positioned at its upper end, (ii) an 8-cells×8-cells ArUco-based marker 610 positioned at a distance from said hole 608 (such that the hole 608 does not overlap with the ArUco-based marker 510), and (iii) a pin 612 protruding from the side of surface 606 that does not contain the 8-cells×8-cells ArUco-based marker 610, such that the protruding pin 612 is situated opposite hole 608.

The female member 604 includes a surface 614, which coincides with surface 606 of male member 602, and a protrusion 616 configured to accommodate pin 614, as the male member 602 and the female member 604 are coupled together.

In operation, the pin 612 of male member 602 is passed therethrough an animal's body part (e.g., an animal's ear), from one side of the body part to the other, so that on the other side, the pin 612 is inserted into the hollow protrusion 616 of female member 604, where it is held. At the end of this operation, the male member 602 and the female member 604 are found on opposite sides of the animal's body part and the two-piece tag 600 is coupled to the animal's body part.

Turning to FIG. 7C there is shown another example of tag 400, in accordance with the presently disclosed subject matter.

As shown in FIG. 7C, tag 400 may be a one-piece tag, denoted 700. One-piece tag 700 includes a surface 702 containing (i) a male portion 704, positioned at one end of surface 702, (ii) a female portion 706, positioned at the other end of surface 702, and (iii) a 4-cells×4-cells ArUco-based marker 708, positioned on one side of surface 702.

The male portion 704 includes a pin 710 protruding from the opposite side to the side of surface 702 on which the 4-cells×4-cells ArUco-based marker 708 is positioned, whereas the female portion 706 includes a hole 712 directed to accommodate the pin 710.

In operation, the one-piece tag 700 is looped around a body part of an animal (an ear, a neck, a leg, etc.) and/or, whilst pin 710 is inserted into hole 712, where it is held. At the end of this operation, the male portion 704 and the female portion 706 are coupled to one another, looping the one-piece tag 700 around the animal's body part.

In some cases, alternatively or additionally to the above, the one-piece tag 700 may be looped around an element worn on the animal's body, for example, a collar, and the like.

Although the above description mainly refers to the use of matrix barcode markers in order to identify marked individuals from one or more groups of marked animals located in one or more geographical areas associated with one or more local dictionaries, the ability to distinguish between the different markers, and thus between the different marked individuals, may also be utilized in cases where the marked animals are transferred from the one or more geographical areas to a single centralized location, in which the tags used to mark the groups of marked animals can no longer be used. For example, once a group of marked animals from different geographic areas reaches a certain weight, they ought to be transported to a slaughterhouse for slaughter. Upon the arrival of the marked group of animals at the slaughterhouse, as part of the preparation procedure for slaughter, the tags used to mark them are removed, which impairs the ability to continue monitoring each individual from the group of individuals.

To enable continuous monitoring of the various individuals of the group of individuals, even after their tags have been removed, the matrix barcode marker associated with each of them can be imprinted on their bodies, thus preserving the ability to monitor each individual throughout the slaughter procedure.

It is to be noted, with reference to FIG. 3, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for animal identification comprising a processing circuitry configured to:
- provide a global dictionary including a plurality of markers, wherein each marker is distinct and each is composed of a plurality of cells forming a matrix code;
- allocate a subset of markers of the plurality of markers to a local dictionary of multiple local dictionaries, such that each local dictionary is associated with the subset of markers of the plurality of markers of the global dictionary, and at least two local dictionaries of said multiple local dictionaries include at least one common marker;
- obtain a reading including: (i) a marker, and (ii) an identifier associated with a local dictionary of the multiple local dictionaries;
- determine whether the marker is found within the subset of markers associated with the local dictionary of the multiple local dictionaries;
- upon the marker being within the subset of markers associated with the local dictionary, perform a first action associated with said local dictionary;
- upon the marker not being within the subset of markers associated with the local dictionary, determine whether the marker is found within the global dictionary;
- upon the marker being within the global dictionary, perform a second action.

2. The system of claim 1, wherein each subset of markers associated with a local dictionary is composed of randomly selected markers selected from the plurality of markers of the global dictionary.

3. The system of claim 1, wherein each subset of markers associated with a local dictionary is composed of a plurality of markers in which each pair of markers has a number of differences between its respective matrix codes that is above a predefined threshold.

4. The system of claim 1, wherein upon the matrix code of said marker, when compared to a marker of the subset of markers of the local dictionary, having a number of differences that is below a threshold, said marker is considered to be the marker.

5. The system of claim 1, wherein each local dictionary of the multiple local dictionaries is associated with a geographical area.

6. The system of claim 5, wherein said geographical area is a pen.

7. The system of claim 1, wherein the markers are ArUco-based markers.

8. The system of claim 1, wherein said reading of said marker is performed using an active IR camera.

9. The system of claim 1, wherein said reading of said marker is performed using a visual spectrum camera.

10. The system of claim 1, wherein said reading of said marker is performed using a camera having visual spectrum and IR imaging obtaining capabilities.

11. The system of claim 1, wherein: (a) the marker is placed on an animal tag comprising a surface with a hole, such that said given marker covers at least a portion of said surface, (b) at least a portion of said marker overlaps with said hole of said surface, giving rise to an unreadable matrix barcode portion, and (c) the reading of said marker does not necessitate the reading of said unreadable matrix barcode portion.

12. A method for animal identification comprising:
- providing a global dictionary including a plurality of markers, wherein each marker is distinct and each is composed of a plurality of cells forming a matrix code;
- allocating a subset of markers of the plurality of markers to a local dictionary of multiple local dictionaries, such that each local dictionary is associated with the subset of markers of the plurality of markers of the global dictionary, and at least two local dictionaries of said multiple local dictionaries include at least one common marker;
- obtaining a reading including: (i) a marker, and (ii) an identifier associated with a local dictionary of the multiple local dictionaries;
- determining whether the marker is found within the subset of markers associated with the local dictionary of the multiple local dictionaries;
- upon the marker being within the subset of markers associated with the local dictionary, performing a first action associated with said local dictionary;
- upon the marker not being within the subset of markers associated with the local dictionary, determining whether the marker is found within the global dictionary;
- upon the marker being within the global dictionary, perform a second action.

13. The method of claim 12, wherein each subset of markers associated with a local dictionary is composed of randomly selected markers selected from the plurality of markers of the global dictionary.

14. The method of claim 12, wherein each subset of markers associated with a local dictionary is composed of a plurality of markers in which each pair of markers has a number of differences between its respective matrix codes that is above a predefined threshold.

15. The method of claim 12, wherein upon the matrix code of said marker, when compared to a marker of the subset of markers of the local dictionary, having a number of differences that is below a threshold, said marker is considered to be the marker.

16. The method of claim 12, wherein each local dictionary of the multiple local dictionaries is associated with a geographical area.

17. The method of claim 12, wherein said reading of said marker is performed using an active IR camera.

18. The method of claim 12, wherein said reading of said marker is performed using a visual spectrum camera.

19. The method of claim 12, wherein said reading of said marker is performed using a camera having visual spectrum and IR imaging obtaining capabilities.

20. A non-transitory computer readable storage medium having computer readable program code embodied therewith, the computer readable program code, executable by at least one processor to perform a method for animal identification, the method comprising:

providing a global dictionary including a plurality of markers, wherein each marker is distinct and each is composed of a plurality of cells forming a matrix code;

allocating a subset of markers of the plurality of markers to a local dictionary of multiple local dictionaries, such that each local dictionary is associated with the subset of markers of the plurality of markers of the global dictionary, and at least two local dictionaries of said multiple local dictionaries include at least one common marker;

obtaining a reading including: (i) a marker, and (ii) an identifier associated with a local dictionary of the multiple local dictionaries;

determining whether the marker is found within the subset of markers associated with the local dictionary of the multiple local dictionaries;

upon the marker being within the subset of markers associated with the local dictionary, performing a first action associated with said local dictionary;

upon the marker not being within the subset of markers associated with the local dictionary, determining whether the marker is found within the global dictionary;

upon the marker being within the global dictionary perform a second action.

* * * * *